United States Patent [19]

Sawabe et al.

[11] 4,436,310
[45] Mar. 13, 1984

[54] SEALING DEVICE FOR JOINT

[75] Inventors: Masaki Sawabe, Okazaki; Tadanobu Kumagai, Toyota, both of Japan

[73] Assignee: Toyota Jidosha Kogyo Kabushiki Kaisha, Toyota, Japan

[21] Appl. No.: 391,832

[22] Filed: Jun. 24, 1982

[30] Foreign Application Priority Data

Oct. 6, 1981 [JP] Japan ............................ 56-147725[U]

[51] Int. Cl.³ ............................ F16D 3/84; F16J 3/00
[52] U.S. Cl. .................................... 277/11; 277/178; 403/57; 464/175
[58] Field of Search ............................ 403/288, 57–58; 277/12, 212 FB, 212 R, 178; 464/175, 111

[56] References Cited

U.S. PATENT DOCUMENTS

| 3,776,107 | 12/1973 | Molus | 277/178 |
| 4,101,138 | 7/1978 | Caggiano | 277/11 |
| 4,132,422 | 1/1979 | Sankey et al. | 277/212 FB |
| 4,291,552 | 9/1981 | Orain | 403/57 |
| 4,360,209 | 11/1982 | Ukai et al. | 464/175 |

Primary Examiner—Robert I. Smith
Attorney, Agent, or Firm—Oblon, Fisher, Spivak, McClelland & Maier

[57] ABSTRACT

A sealing device for a joint, such as a tripod joint including flanges to be joined to each other, has a sealing member having an endless shape and provided with a plurality of projections and an end cover having its periphery held between the flanges and adapted to hold the sealing member in association with the flange of the casing. The end cover is provided with a plurality of through holes to receive the projections of the sealing member. The holes are visible from outside when the flanges are joined to form the joint.

14 Claims, 7 Drawing Figures

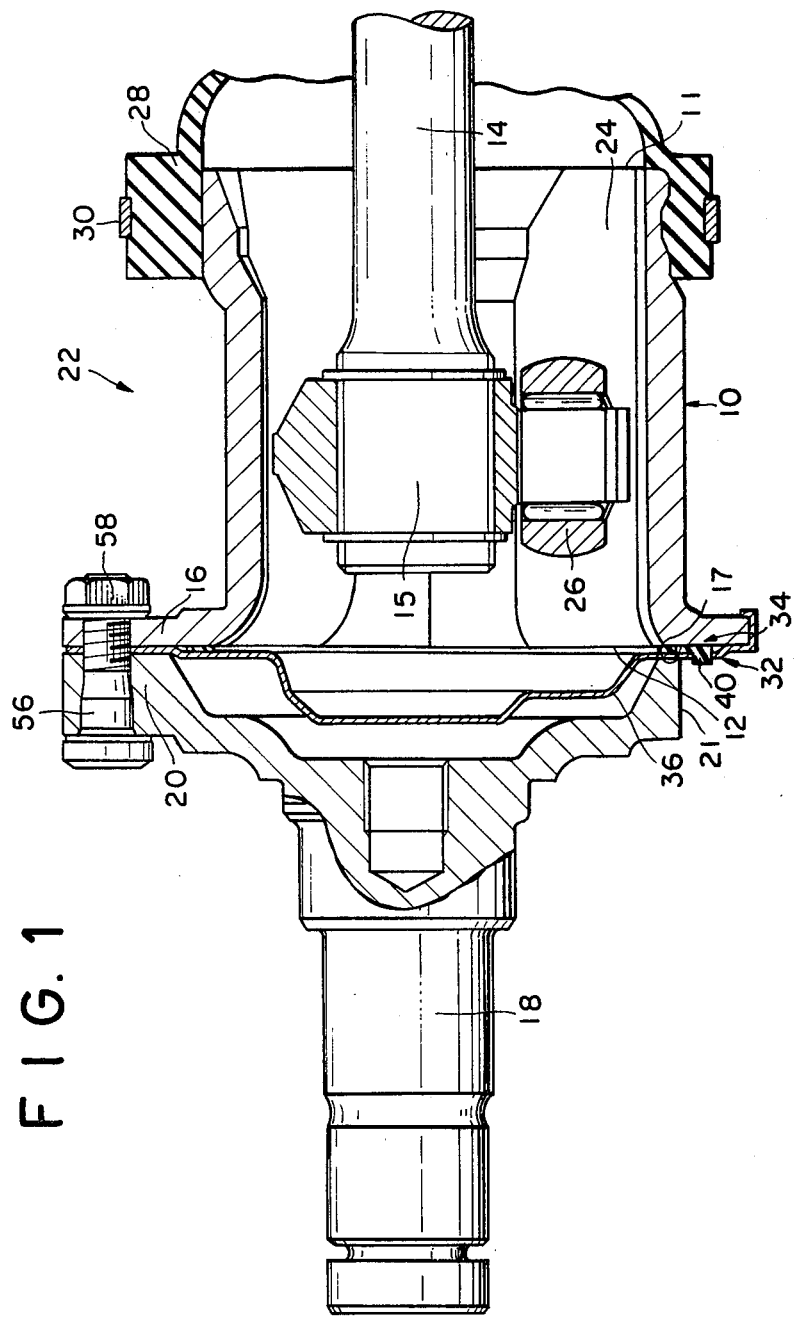

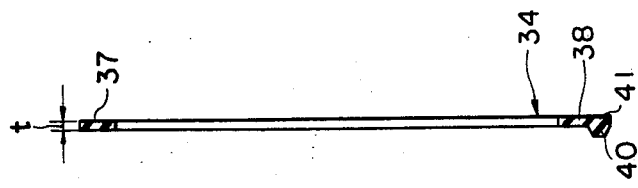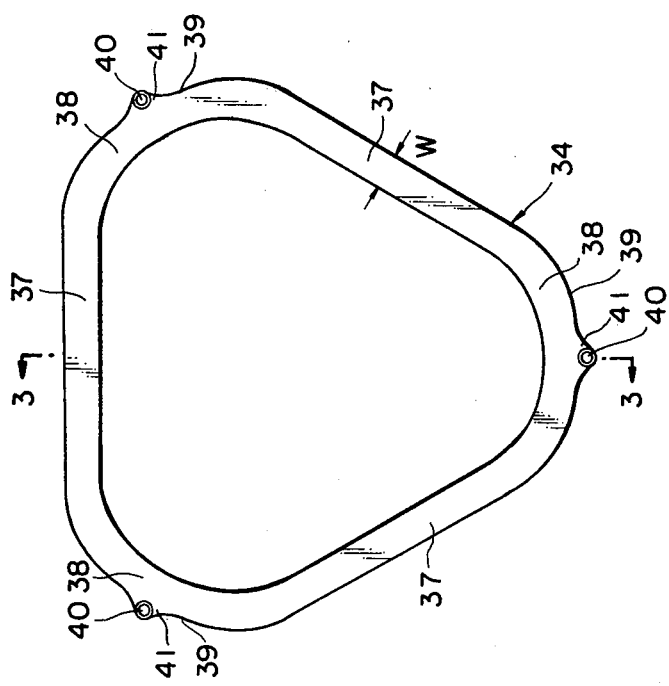

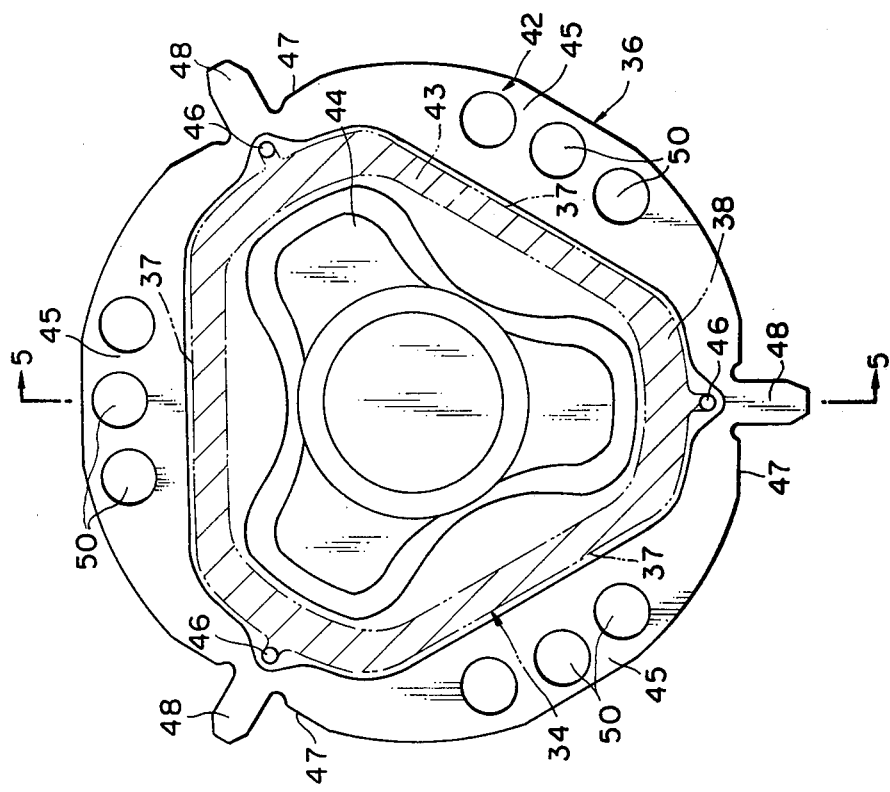

SEALING DEVICE FOR JOINT

BACKGROUND OF THE INVENTION

1. Field of the Invention

The present invention relates to a sealing device for a joint such as a tripod joint or Birfield joint for automobiles which comprises a first shaft, rotary means arranged around an end portion of the first shaft, a casing receiving the rotary means through one end and provided with a flange on the periphery of the other end thereof, and a second shaft provided with a flange at one end thereof to be connected to the flange of the casing, and more particularly to a sealing device disposed between the flanges.

2. Description of the Prior Art

In a joint of the type as mentioned in the above, it is common that a grease is enclosed in the casing for lubricating the rotary means. in order to prevent leakage of the grease, it is common to place a rubber boot between the opening end of the casing and the first shaft which extends through the opening end, and to insert a rubber packing between the joined flanges.

The essential function of such a joint is to transmit a driving power from the first shaft via the casing to the second shaft or inversely from the second shaft to the first shaft. If a rubber packing is inserted between the joined flanges, this essential function of transmitting a driving power can not satisfactorily be performed because of the resiliency of the rubber packing. In order to overcome this difficulty, a system has been proposed and practically in use, wherein an end cover is placed as a blind plate between the flanges so that the periphery of the end cover is held between the flanges and the packing is held between a portion of the end cover inside of the periphery and the flange of the casing.

However, in such a conventional system, there are certain problems at the time of assembling. Namely, in order to avoid dislocation of the packing, it is necessary to fix the position of the packing at the time of assembling. However, there has been no satisfactory method available which is capable of efficiently and precisely positioning the packing. For instance, it is conceivable to paste up the packing on the end cover. However, it is not necessarily easy to paste up the packing uniformly. It is likely that some portions are not properly stuck while other portions are stuck. Even when the packing is entirely adhered to the end cover, if there exists an irregularity in the distribution of the amount of the adhesive, it is possible that the sealing becomes defective. Further, the work involved in such a pasting-up operation adds to the costs.

Further, upon completion of the assembling, the packing is not visible from outside the joint, and it is therefore impossible to ascertain whether the packing is properly located at the predetermined position.

SUMMARY OF THE INVENTION

Accordingly, it is an object of the present invention to provide a sealing device for a joint which is capable of properly locating a sealing member at a predetermined position at the time of assembling, thereby to prevent a dislocation of the sealing member, and which, at the same time, makes it possible to ascertain from outside the joint the proper location of the sealing member upon completion of the assembling.

The sealing device of the present invention comprises a sealing member having an endless shape and provided with a plurality of projections, and an end cover with its periphery held between said flanges and adapted to hold the sealing member in association with the flange of said casing. The end cover is provided with a plurality of through holes to receive the projections of the sealing member, and the holes are visible from outside when said flanges are joined.

Other objects and features of the present invention will become apparent from the following description of the preferred embodiments with reference to the accompanying drawings.

BRIEF DESCRIPTION OF THE DRAWINGS

FIG. 1 is a cross sectional view of a tripod joint in which the sealing device of the present invention is applied.

FIG. 2 is a front view of a sealing member used in the sealing apparatus.

FIG. 3 is a cross sectional view taken along the line 3—3 of FIG. 2.

FIG. 4 is a front view of an end cover as viewed from the side facing the sealing member.

FIG. 5 is a cross sectional view taken along the line 5—5 of FIG. 4.

PREFERRED EMBODIMENTS OF THE INVENTION

Figure 6:
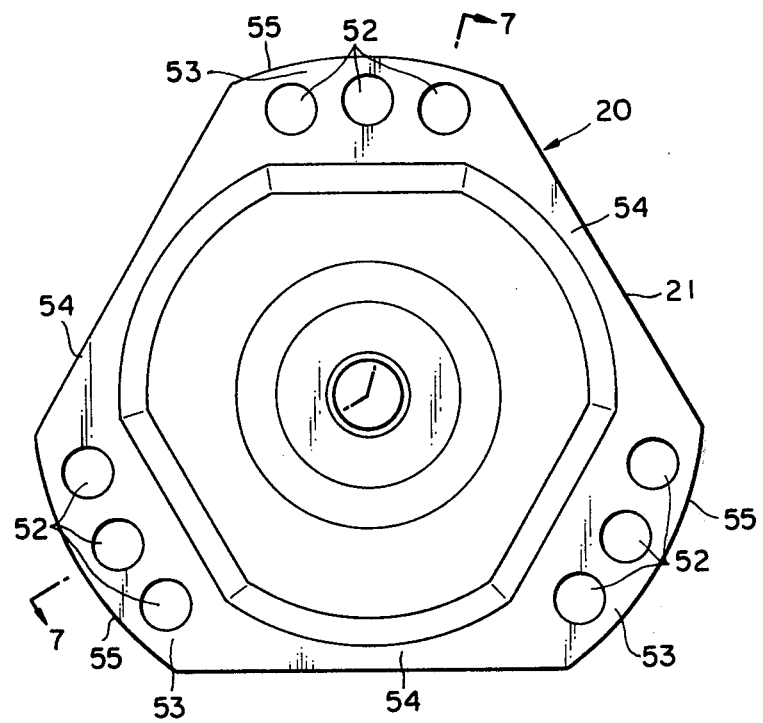
FIG. 6 is a front view of a flange of a second shaft as viewed from the side facing the end cover.

Referring to FIG. 1, a joint 22 comprises a first shaft 14, a casing 10 receiving an end of the first shaft 14 and provided with a flange 16, and a second shaft 18 provided with a flange 20. The sealing device of the present invention is disposed between the flanges 16 and 20 of the joint. The casing 10 has two openings 11 and 12 in its axial direction. The first shaft 14 extends through the opening 11, and the flange 16 extends outwardly at the opening 12.

In the illustrated embodiment, the casing 10 is designed for a tripod joint, and has three internal grooves 24 formed circumferentially in equal intervals to receive rollers 26 arranged around the end portion 15 of the first shaft 14. The first shaft may be a driving shaft. A rubber boot 28 is put on the first shaft 14 and the end of the casing at the opening 11. One end of the boot 28 is secured to the end of the casing 10 by a clamp 30 and the other end of the boot 28 is likewise secured to the first shaft 14 by a clamp. Thus, a grease enclosed in the casing 10 is sealed by this boot 28 at the side of the opening 11.

The sealing device of the present invention may be applied to a Birfield joint as well as to the illustrated tripod joint. In the case of the tripode joint, the casing 10 is internally provided with three roller grooves and the rotary means arranged around the end portion 15 of the first shaft 14 are rollers. Whereas, in the case of the Birfield joint, the casing is internally provided with six ball grooves, and the rotary means are balls. In either case, the configuration of the grooves and the manner of attaching the rotary means to the end portion of the first shaft may be those per se known in the art.

The sealing device 32 of the present invention comprises a sealing member 34 and an end cover 36.

The sealing member 34 is made of rubber, and it is formed in an endless shape as shown in FIGS. 2 and 3. In the illustrated embodiment, it has a generally triangular shape having three linear portions 37 and three rounded corner portions 38. The width W and the thickness t of this sealing member 34 are determined taking into accounts the interference, the pressure resistance, etc. which are required for the particular sealing member. At the center of each rounded corner portion 38 at the periphery of the sealing member, a cylindrical projection 40 is integrally formed on the sealing member 34. The projections 40 are received in through holes formed on the end cover 36, as will be described hereinafter, whereby the primary function of the projections is to locate the sealing member at a proper position at the time of assembling. For this purpose, it is necessary to provide at least 2 projections. The locations of the projections may be optionally selected. On the other hand, these projections play another role as an indicator for the proper location of the sealing member after the joint has been assembled. Namely, by inspecting the holes receiving these projections, from outside the joint, it is possible to ascertain whether the sealing member is properly positioned. For this purpose, the projections 40 should be formed at proper positions depending upon the configuration of the flange 20 provided on the shaft 18 so that they can be observed from outside the assembled joint.

In the illustrated embodiment, the periphery 21 of the flange 20 linearly extends across the rounded corner portions 38 of the sealing member 34, as will be described hereinafter, and the projections 40 are therefore formed on portions 41 which are radially outwardly protruded from the periphery 39 of the rounded corner portions 38, and they extend in a direction perpendicular to such protruded portions, i.e. the axial direction of the casing. When assembled, these projections 40 do not receive an axial compression force from the end cover 36 or the flange 20, and accordingly, they do not contribute to the sealing efficiency. In the case where the projections are formed on the portions 41 protruded from the rounded corner portions 38, the sealing face formed by the compressed sealing member when assembled, becomes uniform over the entire sealing member, and such an arrangement is particularly preferred.

The end cover 36 is held between the flanges 16 and 20 along its periphery and thus attached at the opening 12 of the casing 10, on one hand, and it holds the sealing member 34 in association with the flange 16, on the other hand. At the periphery of the end cover 36, there is formed a support portion 42 having a flat surface on both sides and to be held between the flanges 16 and 20, and inside of this support portion 42, there is formed a setting portion 43 having a flat surface and adapted to set the sealing member thereon, as shown in FIGS. 4 and 5. A concave portion 44 is formed inward of the setting portion 43. The end cover 36 is provided with through holes 46 at positions corresponding to the locations of the projections 40 of the sealing member when the sealing member 34 is set at the setting portion 43, as shown by oblique lines in FIG. 4. The outer diameter of the projection 40 and the inner diameter of the holes 46 are determined so that the projection 40 is resiliently fit in the holes 46 by the resiliency of the rubber projection. The end cover 36 has bent portions 48 which are radially outwardly extending from its periphery 47 at positions corresponding to the holes 46. At each part 45 of the support portion 42 of the end cover 36, which corresponds to each linear portion of the sealing member 34, there are provided three bolt holes 50. This end cover may be formed by pressing.

The depth d from the support portion 42 to the setting portion 36 of the end cover 36 is slightly less than the thickness t of the sealing member 34 and the difference (t-d) constitute a interference for the sealing member 34 when assembled. Accordingly, the depth d for the setting portion 43 is determined taking the thickness of the sealing member 34 and the required interference into accounts. The sealing member 34 placed on this setting portion 43 is pressed against the joint surface 17 of the flange 16.

The flange 16 of the casing 10 has substantially the same profile as the profile of the end cover as shown in FIG. 4 but with the bent portions 48 omitted. The flange 16 has a flat joint surface 17 corresponding to the support portion 42 of the end cover 36 and the sealing member 34 place on the setting portion 43 of the end cover. The joint surface 17 is provided with bolt holes corresponding, in the number and locations, to the bolt holes 50 provided at the parts 45 of the end cover 36.

As shown in FIG. 6, the flange 20 of the second shaft 18 has a generally triangular shape having three linear portions and three rounded corner portions. It has three joint surfaces 53 each provided with three bolt holes 52 and press surfaces 54 between the joint surfaces 53. The joint surfaces 53 and the press surfaces 54 are in the same plane. The bolt holes 52 provided on each joint surface 53 are located at positions corresponding to the bolt holes 50 provided on each part 45 of the support portion 42 of the end cover 36. The periphery 21 of each press surface 54 extends linearly across a rounded corner portion 38 of the sealing member 34 in an assembled state. Accordingly, when this flange 20 is joined to the flange 16 of the casing 10, the projections 40 of the sealing member 34 and the holes 46 of the end cover 36 are located at positons radially outward of the press surface 54.

In assembling the sealing device of the present invention, firstly the sealing member 34 is placed on the end cover 36, by pressing the projections 40 of the sealing member 34 into the holes 46 of the end cover 36. Then, the end cover 36 thus holding the sealing member 34 is placed on the flange 16 so that the sealing member 34 abuts against the joint surface 17 of the flange 16, and the flange 20 is placed to hold the support portion 42 of the end cover 36 in association with the flange 16. Then, bolts 56 are passed through the respective bolt holes and the flanges are fastened by screwing nuts 58 on the bolts 56, as shown in FIG. 1, whereupon the sealing member 34 is compressed by the end cover 36 and the joint surface 17 of the flange 16 and deforms to provide adequate sealing. In this case, the press surface 54 of the flange 20 are pressed against the back side of the end cover, whereby the sealing member 34 receives a uniform pressing force over the entire structure. On the other hand, the flanges 16 and 20 are joined with the support portion 42 of the end cover 36 held therebetween and thus serve to transmit a driving force from the first shaft 14, via the rollers 26 and the casing 10 to the second shaft 18, or in the reversed direction. After tightly screwing the nuts 58 on the bolts 56, the bent portions 48 of the end cover 36 are bent over the periphery of the flange 16 and caulked against the back side of the flange 16. This caulking operation can readily and securely be done by forming the periphery 47 of the end cover to be linear in the vicinity of the bent portions 48 as shown in FIG. 4 and by forming the corresponding periphery of the flange 16 to be likewise linear. The sealing at the rounded corner portions 38 of the sealing member 34 is ensured more effectively by these bent portions.

In order to complete the assembly of the joint 22, it is necessary to conduct the centering of the flanges 16 and 20. This centering is usually done with use of a so-called faucet joint or a socket and spigot joint, in which spigots provided on one flange are fit in sockets provided on the other flange. However, in the case where an end cover is present between the flanges, it is not possible to provide a spigot and socket respectively on the joint surfaces of the flanges, and it is therefore obliged to provide such a spigot and socket at the peripheries of the flanges. Consequently, the outer diameters of the flanges will have to be made larger. This is disadvantageous for a joint for an automobile where the space for installment is rather limited.

Figure 7:
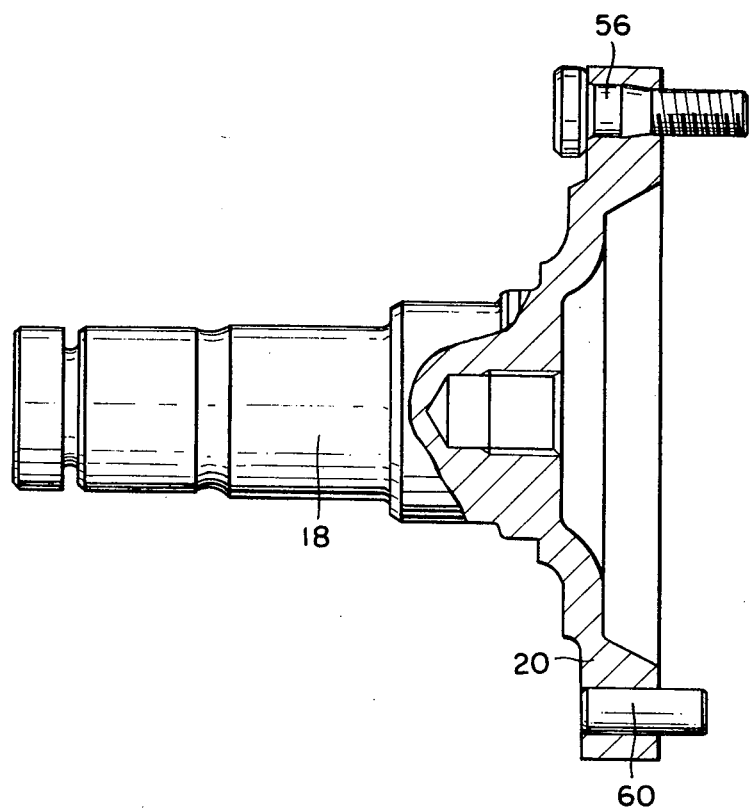
FIG. 7 is a cross sectional view taken along the line 7—7 of FIG. 6, and illustrating an embodiment suitable for centering the two flanges.

Acccordingly, it is preferred to provide a plurality of knock pins 60 on the flange 20 of the second shaft 18 as shown in FIG. 7, and to carry out the centering of the flanges 16 and 20 by means of these knock pins 60. The knock pins 60 may be fit in, for instance, the center bolt holes at the two rounded corner portions 55 among the joint surfaces shown in FIG. 6. For the centering of the flanges 16 and 20, it is necessary to precisely set the relative positions of the knock pins 60, and accordingly, it is most preferred to use two knock pins. At the corresponding positions on the flange 16 and end cover 36, knock pin holes should be formed with precision instead of the bolt holes. With use of such knock pins, it is possible to adequately increase the precision of the relative positioning of the knock pins, the outer diameter precision of the knock pins and the inner diameter precision of the knock pin holes in which the knock pins fit, whereby it is possible to satisfactory carry out the centering of the two flanges. By securely fixing the knock pins to the flange of the second shaft, the centering can readily be done without troubles even when the casing 10 is formed by pressing a cylindrical member.

In the above mentioned embodiment, the sealing device is applied to a tripod joint, wherein the sealing member is formed into a generally triangular endless shape. Whereas, in the case where the sealing device is applied to a Birfield joint, the sealing member is formed into a circular endless shape, i.e. a ring shape. In the Birfield joint, the two flanges are substantially circular. However, it is possible to form notches or openings at proper positions of the flange of the second shaft and to locate the through holes of the end cover therein so that the holes can be visible from outside when the joint has been assembled. Thus, it is possible to inspect whether or not the sealing member is properly positioned or dislocated.

According to the sealing device of the present invention, a plurality of projections are provided on the sealing member and the corresponding through holes to receive the projections are provided on the end cover, whereby the sealing member can be properly held at a predetermined position at the time of assembling the joint. Further, as the holes and projections are visible from outside once the joint has been assembled, it is possible to see if the sealing member is present or not, or if the sealing member is positioned at the predetermined location or not. Thus, it is thereby possible to prevent a mishap of leakage of the grease from the joint.

What is claimed as new and desired to be secured by Letters Patent of the United States is:

1. A combination including a joint and a sealing device, said joint comprising a first shaft, a casing receiving an end portion of the first shaft through one end and provided with a flange on the periphery of the other end thereof, and a second shaft provided with a flange at one end thereof to be joined to the flange of the casing, said sealing device comprising a sealing member having an endless shape and provided with a plurality of projections, and an end cover with its periphery held between said flanges and adapted to hold the sealing member in association with the flange of said casing, said end cover being provided with a plurality of through holes each of which receives one of the projections of the sealing member, and said flange of said second shaft being formed so as to make visible from outside of said joint, when said flanges are joined, the reception of said projections in said holes.

2. The combination of claim 1, wherein said projections of the sealing member are formed on radially outwardly protruded portions of the sealing member and extend in a direction perpendicular to the protruded portions, respectively.

3. The combination of claim 1 or 2, wherein said sealing member has a generally triangular shape having three linear portions and three rounded corner portions, and said projections are provided at the respective centers of the rounded corner portions.

4. The combination of claim 3, wherein said end cover has radially outwardly extending bent portions at positions corresponding to the plurality of the holes.

5. A combination including a joint and a sealing device, said joint comprising a first shaft, a casing receiving an end portion of the first shaft through one end and provided with a flange on the periphery of the other end thereof, and a second shaft provided with a flange at one end thereof to be joined to the flange of the casing, said sealing device comprising a sealing member having a generally triangular endless shape having three linear portions and three rounded corner portions and radially outwardly protruded portions at the respective centers of the rounded corner portions, and provided with projections formed on said protruded portions, and an end cover with its periphery held between said flanges and adapted to hold said sealing member in association with the flange of said casing, said end cover being provided with three through holes each of which receives one of said projections of the sealing member and radially outwardly extending bent portions at its peripheral positions corresponding to said holes, and said flange of said second shaft being formed so as to make said holes visible when said flanges are joined.

6. A tripod joint of the type which comprises a first shaft, three rollers arranged around the first shaft at one end, a casing having three internal grooves formed circumferentially in equal interval to receive said rollers and provided at one end with a flange, a second shaft provided at one end with a flange to be joined to the flange of the casing, and a sealing device disposed between siad flanges, wherein said sealing device comprises a sealing member having an endless shape and provided with a plurality of projections, and an end cover with its periphery held between said flanges and adapted to hold the sealing member in association with the flange of said casing, said end cover being provided with a plurality of through holes to receive the projections of the sealing member, and said flange of said second shaft being formed such that said holes are visible from outside when said flanges are joined.

7. The tripod joint as claimed in claim 6, wherein said projections of the sealing member are formed on radially outwardly protruded portions of the sealing member and extend in a direction perpendicular to the protruded portions, respectively.

8. The tripod joint as claimed in claim 6 or 7, wherein said sealing member has a generally triangular shape having three linear portions and three rounded corner portions; said projections are provided at the respective centers of the rounded corner portions; the flange of the second shaft has a front face profile of a generally triangular shape having three linear portions and three rounded corner portions; and when the flange of the second shaft is joined to the flange of the casing, the peripheries of the three linear portions of the flange of the second shaft extend across the three rounded corner portions of said sealing member.

9. The tripod joint as claimed in claim 8, wherein said end cover has radially outwardly extending bent portions at positions corresponding to the plurality of the holes, and said bent portions are bent over the peripheral edge of the flange of the casing and caulked against the back side of the flange of the casing.

10. A tripod joint of the type which comprises a first shaft, three rollers arranged around the first shaft at one end, a casing having three internal grooves formed circumferentially in equal interval to receive said rollers and provided at one end with a flange, a second shaft provided at one end with a flange to be joined to the flange of the casing, a plurality of knock pins for centering provided one one of said flanges, a plurality of pin holes provided on the other flange to receive said knock pins, and a sealing device disposed between said flanges, wherein said sealing device comprises a sealing member having an endless shape and provided with a plurality of projections, and an end cover with its periphery having a plurality of pin holes to receive said knock pins, held between said flanges, and adapted to hold the sealing member in association with the flange of said casing, said end cover being provided with a plurality of through holes to receive the projections of the sealing member, and said through flange of said second shaft being formed such that said holes are visible from outside when said flanges are joined.

11. The tripod joint as claimed in claim 10, wherein said plurality of knock pins are two knock pins provided on the flange of the second shaft.

12. The tripod joint as claimed in claim 11, wherein the projections of the sealing member are formed on raidally outwardly protruded portions of the sealing member and extend in a direction perpendicular to the protruded portions, respectively.

13. The tripod joint as claimed in claim 11 or 12, wherein said sealing member has a generally triangular shape having three linear portions and three rounded portion; said projections are provided at the respective centers of the rounded portions; the flange of the second shaft has a front face profile of a generally triangular shape having three linear portions and three rounded corner portions; and when the flange of the second shaft is joined to the flange of the casing, the peripheries of the three linear portions of the flange of the second shaft extend across the three rounded corner portions of said sealing member.

14. The tripod joint as claimed in claim 13, wherein said end cover has radially outwardly extending bent portions at positions corresponding to the plurality of the through holes, and said bent portions are bent over the peripheral edge of the flange of the casing and caulked against the back side of the flange of the casing.

* * * * *